UNITED STATES PATENT OFFICE.

CARL MAUTERER, OF KARLSRUHE, GERMANY.

PROCESS FOR THE MANUFACTURE OF AN EASILY-DIGESTIBLE FOOD FROM WHOLE GRAIN.

1,086,382. Specification of Letters Patent. Patented Feb. 10, 1914.

No Drawing. Application filed June 21, 1913. Serial No. 775,059.

*To all whom it may concern:*

Be it known that I, CARL MAUTERER, a subject of the Emperor of Germany, residing at Karlsruhe, in the State of Baden, German Empire, have invented certain new and useful Improvements in Processes for the Manufacture of an Easily-Digestible Food from Whole Grain, of which the following is a specification.

This invention relates to a process for the manufacture of an easily digestible food from whole grain.

The process consists in first subjecting the husked grain to a swelling operation and subsequent loosening operation in the heat and drying so as to render it fit to be eaten. The dry grains as fresh as possible are then glazed with a suitable edible composition which will melt in heat, for instance burnt sugar, chocolate or the like, and the glazed grain is then shaped by gentle pressure into the form of blocks, bars, cakes or the like. By varying the selection of the grain and of the fusible edible composition employed for covering the grain, a series of different tasty and easily digestible foods may be made from whole grain. The grain is of loose texture, can be well acted upon by the teeth and in being chewed become thoroughly penetrated by the saliva of the mouth, which is an excellent thing in the case of a starchy food. These new foods are very suitable especially for vegetarians, children and convalescents. By suitably selecting the constituents, important foods for invalids may be produced, for instance a diabetic food from prepared oats coated with levulose or mixtures of levulose and suitably shaped in blocks. The coating composition may receive additions intended to promote digestion or having a medicinal action. For instance, diastase or iron-sugar or hemoglobin or the like may be added to the chocolate employed for glazing the eatable grains.

Instead of husked grain, malted grain may be used or a mixture of malted and unmalted grain. When it is desired to produce a food particularly easy of digestion, slightly malted grain or a mixture of grain and malt may be employed.

The process for the manufacture of the foods from whole grain thus consists of two parts:—

(1) in the preparation of the grain and
(2) in the glazing of the eatable grain and the production of the blocks, cakes, bars, etc., from the glazed grain on which the glaze is still in a melted state.

The preparation of the grain is effected by first swelling the grain with water or watery liquor or by means of steam, and then heating the same in a hot drum or a moderately hot oven or hot cupboard until the water has evaporated. The temperature employed in heating the swelled grain is so selected as to cause the grain to be blown up somewhat so that it will have a porous texture after drying. The temperature is to be varied according to the nature of the preliminary swelling operation and according to the different kinds of grain. In general a temperature in the vicinity of the boiling point of water will be suitable. In the case of some preparations the temperature may be somewhat higher, and in other cases somewhat lower. The treatment of the grain in this manner is similar to or the same as the treatment of prepared rice. If necessary prepared rice (puff cake rice) may be employed.

After the grain has been prepared, that is to say rendered eatable, glazing takes place. According to the glazing employed, the prepared grain is used in a cooled state or in a more or less heated condition. The glazing composition, for instance a fatty chocolate is melted and the grain is then intimately mixed for a time in heat with the melted chocolate. In this operation the pores in the outside surface of the whole grain are closed and also the grain is coated with a uniform covering of the melted composition. Then the mass is preferably shaken or subjected to a slight pressure, whereby the several grains are caused to adhere closely to one another, and thus form a cohesive mass, which can be molded or otherwise shaped into pieces. The proportions of the mixture of grain and chocolate composition or other covering composition is so selected as to produce a good covering of the outside of the grain.

When burnt sugar is used for glazing and agglomerating the several grains into a uniform mass, the burnt sugar is heated until it is thin or free flowing, and then the previously heated grains are introduced into the mass.

The coating composition may also be composed of mixtures of albuminous and fatty seeds with sugar honey; also a mixture of fruits with icing or honey may be employed. Further, mixtures of fat and sugar with or without flavoring additions, such as powdered cocoa may be employed for glazing. It is only necessary that the proportion of melting composition (sugar, fat and the like), shall be sufficient to form in heat a sufficient fluid covering composition which on cooling will become sufficiently solid again to form a durable covering and protect the grain sufficiently against the access of moisture and prevent it from going bad.

In some cases it is sufficient to coat the eatable prepared grain with the covering composition without agglomerating the several grains afterward to form a cohesive mass.

The eatable prepared (or opened) grains readily attract moisture and therefore are very liable to be attacked by mold and to go bad through the action of other microorganisms. Now the glazing of the grains with a durable composition, for instance chocolate, sugar or the like, renders the grain not only palatable, but it also preserves it. Thus a durable food is produced by a suitable combination of two different important foods.

Hitherto no eatable grain has been known which has been prepared in such a manner to form a durable food wherein a glazing means serves to effect palatability, the preservation and if necessary also the agglomeration of the grains into a food in the form of pieces or blocks.

Compared with the well known mixtures of chocolate and malt flour and the like, the new durable food has the advantage of having better keeping qualities and better digestibility, as well as also more rational composition for the purpose of being used regularly as an article of food.

The addition of powdered malt flour to the chocolate composition prevents the latter from being penetrated by the saliva, whereas the present improved process promotes a perfect penetration by the saliva, more perfect in fact than in the manufacture of confectionery or the like.

Foods made in small pieces, according to the process hereinbefore described may be provided subsequently with a coating of glazing composition for the purpose of increasing their keeping qualities. In this connection a correspondingly small quantity of composition may be employed for coating the grains, because the subsequent glazing of the pieces effects a complete closure of the entire outer surface of the pieces. It may be also mentioned that the durable food in the form of separate grains is very suitable as an addition to milk and the like, for the purpose of producing a tasty and easily digestible complete food.

I claim:

1. A process for the manufacture of an easily digestible food from whole grain, which consists in successively swelling, heating and drying the grain stripped of its husk, whereby it is rendered eatable, coating the several eatable dried grains with a hot heat-fusible edible coating composition, and then cooling the coated eatable grains whereby they are provided with an edible preserving covering.

2. A process for the manufacture of an easily digestible food from whole grain, which consists in successively swelling, heating and drying the grain stripped of its husk, whereby it is rendered eatable, coating the several eatable dried grains with a hot heat-fusible sugar composition and then cooling the coated eatable grains, whereby they are provided with an edible preserving coating.

3. A process for the manufacture of an easily digestible food from whole grain, which consists in successively swelling, heating and drying the grain stripped of its husk, whereby it is rendered eatable, coating the several eatable dried grains with hot heat-fusible mixture of sugar and albuminous seed, and then cooling the coated eatable grains whereby they are provided with an edible preserving covering.

4. A process for the manufacture of an easily digestible food from whole oats, which consists in successively swelling, heating and drying the oats stripped of their husks, whereby the oats are rendered eatable, coating the eatable dried oats with a hot heat-fusible composition of levulose, and then cooling the coated eatable oats, whereby an easily digestible food provided with an edible preserving covering is produced which is suitable for invalids and particularly those suffering from diabetes.

In testimony whereof I affix my signature in presence of two witnesses.

CARL MAUTERER.

Witnesses:
HELMA TEICHMANN,
KUNIGUNDE BENNINGER.